United States Patent
Sabetta

(10) Patent No.: US 10,031,841 B2
(45) Date of Patent: Jul. 24, 2018

(54) METHOD AND SYSTEM FOR INCREMENTALLY UPDATING A TEST SUITE UTILIZING RUN-TIME APPLICATION EXECUTIONS

(71) Applicant: Antonino Sabetta, Mougins (FR)

(72) Inventor: Antonino Sabetta, Mougins (FR)

(73) Assignee: SAP SE, Walldorf (DE)

( * ) Notice: Subject to any disclaimer, the term of this patent is extended or adjusted under 35 U.S.C. 154(b) by 172 days.

(21) Appl. No.: 13/927,928

(22) Filed: Jun. 26, 2013

(65) Prior Publication Data

US 2015/0007138 A1    Jan. 1, 2015

(51) Int. Cl.
G06F 9/44 (2018.01)
G06F 11/36 (2006.01)

(52) U.S. Cl.
CPC ...... G06F 11/3684 (2013.01); G06F 11/3676 (2013.01)

(58) Field of Classification Search
None
See application file for complete search history.

(56) References Cited

U.S. PATENT DOCUMENTS

| | | | | |
|---|---|---|---|---|
| 5,758,061 A * | 5/1998 | Plum | ............ | G06F 11/3676 714/35 |
| 6,892,154 B1 * | 5/2005 | Lee | ............ | 702/108 |
| 7,908,590 B1 * | 3/2011 | Min | ............ | G06F 11/3684 717/124 |
| 8,522,083 B1 * | 8/2013 | Cohen | ............ | G06F 11/3672 714/38.1 |
| 8,826,084 B1 * | 9/2014 | Gauf | ............ | G06F 11/3688 714/32 |
| 9,201,775 B1 * | 12/2015 | Cohen | ............ | G06F 11/3684 |
| 2004/0010735 A1 * | 1/2004 | Paternostro | ............ | G06F 11/3684 714/38.14 |
| 2004/0073890 A1 * | 4/2004 | Johnson et al. | ............ | 717/124 |
| 2005/0015675 A1 * | 1/2005 | Kolawa | ............ | G06F 11/3688 714/38.14 |
| 2005/0081104 A1 * | 4/2005 | Nikolik | ............ | G06F 11/3676 714/38.13 |
| 2006/0129992 A1 * | 6/2006 | Oberholtzer | ............ | G06F 11/3428 717/124 |
| 2006/0206870 A1 * | 9/2006 | Moulden, Jr. | ............ | G06F 11/3664 717/124 |
| 2006/0230320 A1 * | 10/2006 | Salvador | ............ | G06F 11/3684 714/38.1 |

(Continued)

OTHER PUBLICATIONS

Shahamiri et al. "An automated framework for software test oracle", 2011, Information and Software Technology.*

(Continued)

*Primary Examiner* — Jue Louie
(74) *Attorney, Agent, or Firm* — Brake Hughes Bellermann LLP

(57) ABSTRACT

The method includes capturing an execution scenario associated with a real-time execution of an application, determining at least one scenario variable based on the execution scenario, generating a test case based on a code template, the execution scenario and the at least one scenario variable, and updating a test suite using the test case, the test suite configured to define a quality test of the application.

20 Claims, 4 Drawing Sheets

(56) References Cited

U.S. PATENT DOCUMENTS

| | | | | |
|---|---|---|---|---|
| 2006/0265691 | A1* | 11/2006 | Klinger | G06F 11/3684 717/124 |
| 2008/0086499 | A1* | 4/2008 | Wefers | G06Q 10/06 |
| 2008/0086660 | A1* | 4/2008 | Wefers | G06F 11/3688 714/37 |
| 2008/0184206 | A1* | 7/2008 | Vikutan | 717/127 |
| 2009/0100299 | A1* | 4/2009 | Betawar et al. | 714/46 |
| 2010/0180260 | A1* | 7/2010 | Chikkadevaiah | G06F 11/3688 717/125 |
| 2010/0287534 | A1* | 11/2010 | Vangala | G06F 11/3612 717/124 |
| 2011/0185231 | A1* | 7/2011 | Balestrieri | G06F 11/3672 714/27 |
| 2011/0231825 | A1* | 9/2011 | Grechanik | G06F 11/368 717/126 |
| 2011/0296244 | A1* | 12/2011 | Fu | G06F 11/3608 714/37 |
| 2013/0326465 | A1* | 12/2013 | Jain | G06F 8/77 717/100 |
| 2014/0156660 | A1* | 6/2014 | Arbon | G06Q 30/0203 707/737 |

OTHER PUBLICATIONS

Wang et al. "Intelligent Test Oracle Construction for Reactive Systems without Explicit Specifications", 2011, Ninth International Conference on Dependable, Autonomic and Secure Computing.*

Alsmadi, et al, "Using User Sessions for Test Case Generation and Execution", IMECS 2008, 4 pages.

Bertolino, "Software Testing Research: Achievements, Challenges, Dreams", IEE Future of Software Engineering, 2007, 19 pages.

Cadar, et al, "Symbolic Execution for Software Testing in Practice—Preliminary Assessment", ICSE '11, May 21-28, 2011, 6 pages.

Edvardsson, "A Survey on Automatic Test Data Generation", Proceedings of the Second Conference on Computer Science and Engineering in Linkoping, Oct. 1999, 8 pages.

Ernst, et al, "The Daikon system for dynamic detection of likely invariants", Science of Computer Programming 69, 2007, pp. 35-45.

Godefroid, "DART: Directed Automated Random Testing", PLDI '05, Jun. 12-15, 2005, 11 pages.

Mahmood, "A Systematic Review of Automated Test Data Generation Techniques", Master Thesis, Software Engineering, Thesis No. MSE-2007: Oct. 26, 2007, 65 pages.

Majumdar, et al, "Hybrid Concolic Testing", Proceedings of the 29th international conference on Software Engineering, 2007, 10 pages.

Xu, et al, "Directed Test Suite Augmentation", Proceedings of the 33rd International Conference on Software Engineering, 2011, 8 pages.

Orso, et al, "Selective Capture and Replay of Program Executions", Workshop on Dynamic Analysis (WODA 2005), May 17, 2005, 7 pages.

Qu, et al, "A Case Study of Concolic Testing Tools and Their Limitations", 2011 International Symposium on Empirical Software Engineering and Measurement (ESEM), Sep. 22-23, 2011, 10 pages.

Santelices, et al, "Test-suite Augmentation for Evolving Software", Proceedings of the 2008 23rd IEEE/ACM International Conference on Automated Software Engineering, 2008, pp. 218-227.

Sen, et al, "CUTE: A Concolic Unit Testing Engine for C", ESECFSE '05, Sep. 5-9, 2005, 10 pages.

Weyuker, "On Testing Nontestable Programs", Technical Report No. 025, New York University, Oct. 1980, 24 pages.

Xu, et al, "Directed Test Suite Augmentation: Techniques and Tradeoffs", FSE-18, Nov. 7-11, 2010, 10 pages.

* cited by examiner

METHOD AND SYSTEM FOR INCREMENTALLY UPDATING A TEST SUITE UTILIZING RUN-TIME APPLICATION EXECUTIONS

FIELD

Embodiments relate to updating application (e.g., software applications) test suites.

BACKGROUND

Cloud computing is a model for enabling ubiquitous, convenient, on-demand network access to a shared pool of configurable computing resources or a cloud infrastructure (e.g., networks, servers, storage, applications, and services) that can be rapidly provisioned and released with minimal management effort or service provider interaction. Software as a Service (SaaS) is a software distribution model in which applications are hosted by a vendor or service provider and made available to customers over the Internet. SaaS is the capability provided to a consumer to use the provider's applications running on a cloud infrastructure. The applications are accessible from various client devices through either a thin client interface, such as a web browser (e.g., web-based email), or a program interface. Typically, the consumer does not manage or control the underlying cloud infrastructure including network, servers, operating systems, storage, or even individual application capabilities.

Platform as a Service (PaaS) (an outgrowth of SaaS) is a paradigm for delivering operating systems and associated services over the Internet without downloads or installation. PaaS is sometimes called "cloudware" because PaaS moves resources from privately owned computers into the cloud. PaaS is the capability to deploy onto the cloud infrastructure, consumer-created or acquired applications created using programming languages, libraries, services, and tools supported by the provider. The consumer does not manage or control the underlying cloud infrastructure including network, servers, operating systems, or storage, but has control over the deployed applications and possibly configuration settings for the application-hosting environment. Generally, with PaaS, operating system features can be changed and upgraded frequently.

With PaaS, distributed development teams can work together on software development projects. Services can be obtained from diverse sources that cross international boundaries. Initial and ongoing costs can be reduced by the use of infrastructure services from a single vendor rather than maintaining multiple hardware facilities that often perform duplicate functions or suffer from incompatibility problems.

SaaS and PaaS introduce a digital marketplace in which numerous software application stores make applications available over the cloud infrastructure. PaaS frees software producers from the need of maintaining a complex infrastructure and offers the software producers ready-to-use, sophisticated, elastic information technology (IT) stack on which applications can be built to target specific markets and application domains. Application stores represent a privileged channel through which an increasing number of ISVs (Independent Software Vendors) reach their customers, targeting specific application domains.

This model (including the cloud, SaaS and PaaS) represents a growth opportunity, but comes with unique challenges. For example, customers may trust the service provider because of previous business relationships or the service provider's reputation. However, as the size of the marketplace grows (e.g., as an open software ecosystem), the likelihood that customers come across an ISV whom they have never encountered before increases. Therefore, (as the marketplace grows) distrust in applications provided by various, and possibly unknown ISVs, is likely to increase. In other words, customers who trust the service provider may encounter difficulties in entrusting their data and their business applications to a small software vendor selling an application running, for example, on a cloud infrastructure.

Software testing is a mechanism for ensuring software quality. Test coverage criteria are used to quantify the thoroughness of the tests conducted and give a quantitative basis for building confidence in the quality of a software program. However, software testing requires a substantial investment which is not always attainable, especially in small organizations. In particular, attaining 100% coverage (or substantially 100% coverage), may be difficult and expensive. As a result, many software products are published to the marketplace before a test coverage indicating an acceptable quality is achieved. For example, real-time executions may trigger certain paths in the program that were not tested by a test case. In addition, the information about real-time executions is lost.

Arguably, the trust gap between potential customers and ISVs may be caused by a lack of transparency regarding quality of the software application. Therefore, there is a need for ensuring the quality of software and there is a need for making quality indicators visible to customers in order to reduce the trust gap and foster the adoption of the application marketplace paradigm.

SUMMARY

One embodiment includes a method. The method includes capturing an execution scenario associated with a real-time execution of an application, determining at least one scenario variable based on the execution scenario, generating a test case based on a code template, the execution scenario and the at least one scenario variable, and updating a test suite using the test case, the test suite configured to define a quality test of the application.

Another embodiment includes a system. The system includes a non-transitory computer readable medium including code segments that when executed by a processor cause the processor to capture an execution scenario associated with a real-time execution of an application, determine at least one scenario variable based on the execution scenario, generate a test case based on a code template, the execution scenario and the at least one scenario variable, and update a test suite using the test case, the test suite configured to define a quality test of the application.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
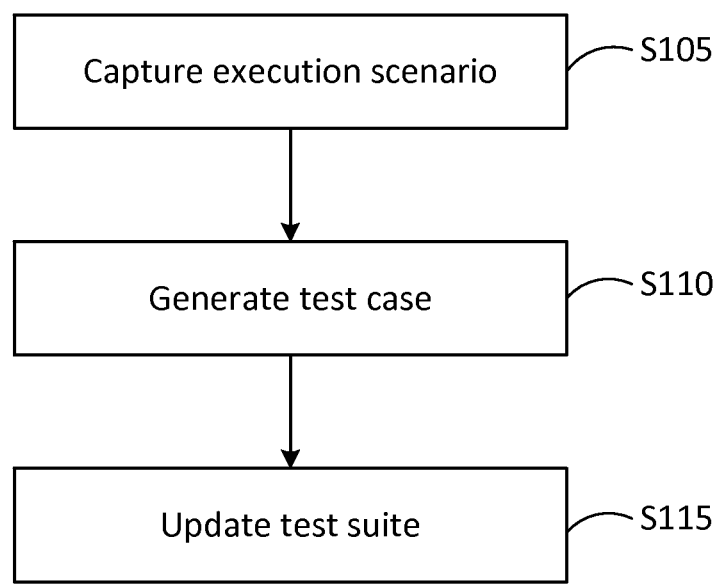
FIG. 1 illustrates a method of updating a test suite according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Example embodiments may automate the task of extending a test suite to incorporate new test cases derived from real-time (e.g., runtime or fielded) executions in order to extend test suite coverage (e.g., a test model) to program points not covered by the original test suite. Example embodiments may capture and record input data and context information from relevant real-time executions. Example embodiments may use the captured data to generate new test case(s).

Figure 4:
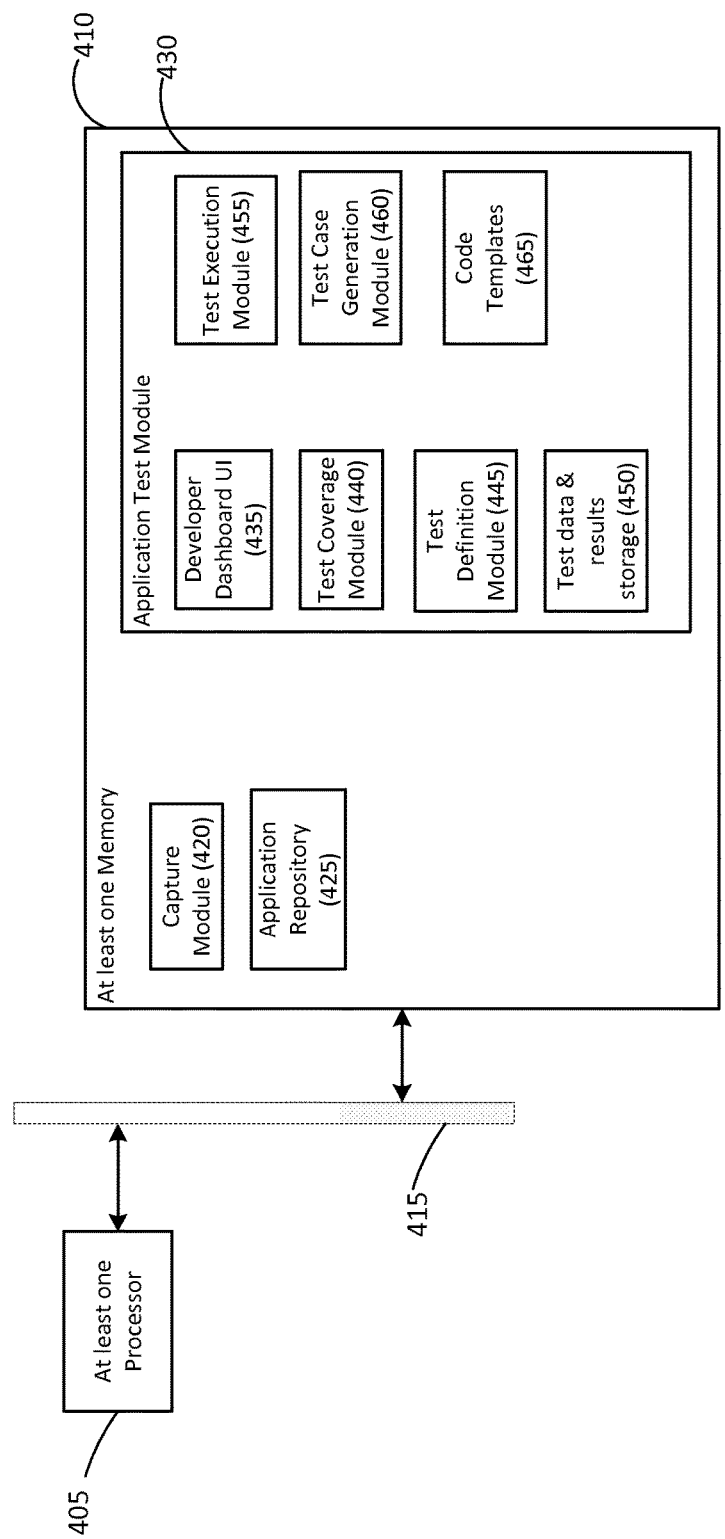
FIG. 4 illustrates a block diagram of an apparatus according to at least one example embodiment.

FIG. 1 illustrates a method of updating a test suite according to at least one example embodiment. The method steps described with regard to FIG. 1 may be executed as software code stored in a memory (e.g., at least one memory 410 described below) associated with a system (e.g., as shown in FIG. 4) and executed by at least one processor (e.g., at least one processor 405 described below) associated with the system. However, alternative embodiments are contemplated such as a system embodied as a special purpose processor.

For example, the method steps may be performed by an application-specific integrated circuit, or ASIC. For example, the ASIC may be configured as one or more of the blocks, or elements of the blocks, (e.g., the application test module 430 described below) and/or the apparatus 400. Although the steps described below are described as being executed by a processor, the steps are not necessarily executed by a same processor. In other words, at least one processor may execute the steps described below with regard to FIG. 1.

As shown in FIG. 1, in step S105 a processor (e.g., at least one processor 405) captures an execution scenario. For example, an execution scenario may include inputs to and outputs of an application (or element of an application). An input (e.g., application input) may include user interaction (e.g., keystrokes or mouse clicks) and/or external data (e.g. files such as video files, picture files and/or data files) and/or system configuration data (e.g., the state of the cloud infrastructure). The inputs and outputs may be associated with real-time execution of the application. For example, the inputs and outputs may be associated with the initial start of the application, an intermediate step or branch of the application and/or a completion (or extended pause) of the application and/or sub-element (e.g., function or routine) of the application.

Capturing an execution scenario may include gathering the inputs and outputs without interfering in the execution of the application. Gathering the inputs and outputs may include reading (without affecting the execution of the application) the input and output data, categorizing (e.g., type of data, where the data came from and/or where the data is sent) and storing the data. In other words, capturing an execution scenario may include gathering real-time application execution input and output data and storing the data in a memory associated with the processor.

In step S110 the processor generates a test case. Execution of an application may include providing an input (and/or initiating action that causes the input to be provided to the application) executing the application based on the input such that the application generates an output. An output (e.g., application output) may be data, an action (e.g., send an email), a display (e.g., on a user interface) and/or a state change (e.g., a change in the state of the cloud infrastructure). A test case, for example, defines the input and the expected output when the application is executed using the input. A test case may define the inputs and how to communicate the inputs to a system. The output is then defined by an oracle (described below). Further, a test case may be implemented such that the test case (and corresponding inputs) are merged (or partially merged) with the oracle in an implementation of a test suite.

In step S115 the processor updates a test suite. A test suite may be, for example, a grouping of test cases utilized to test the quality of an application. The test suite may define what test cases are run on a given application. The test suite may contain detailed instructions and/or goals for each collection of test cases and information on the system configuration to be used during testing. The test suite may also include reporting mechanisms that may report quality test coverage status, quality test completion, quality issues, test failures, and the like. The processor may update the test suite by, for example, adding a test case (including data associated with the captured scenario and expected output), executing a test of the application based on the test case and/or updating quality information about the application (e.g., test coverage status).

Figure 2:
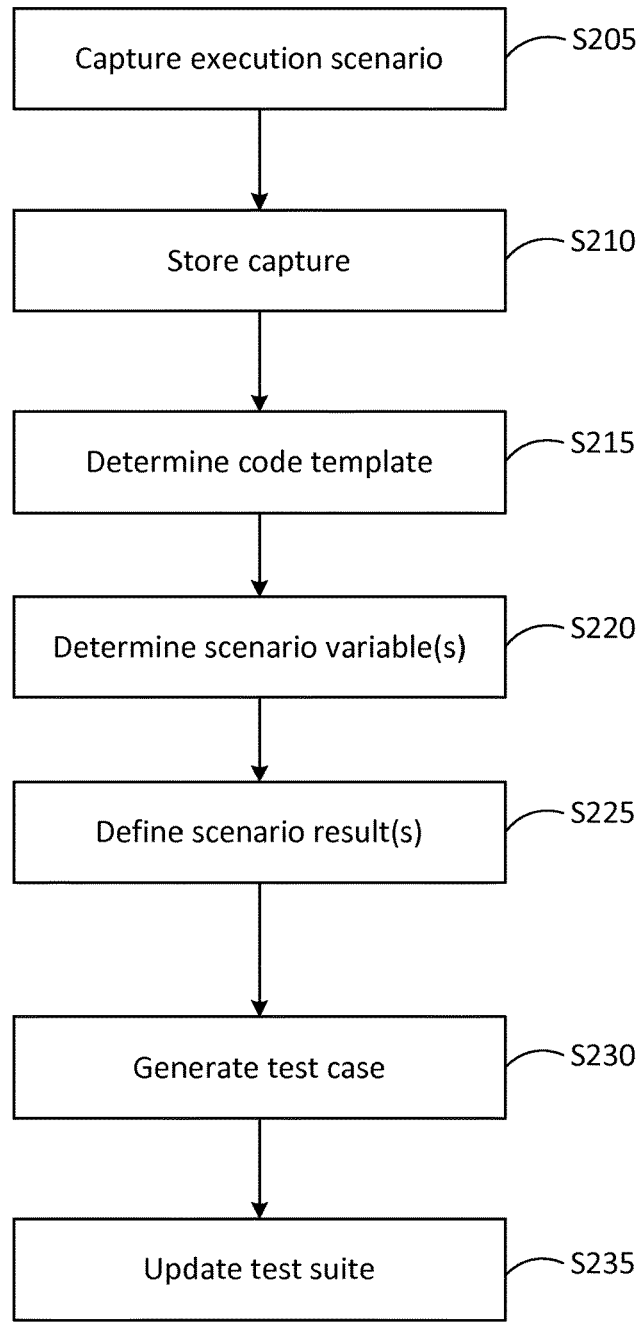
FIG. 2 illustrates another method of updating a test suite according to at least one example embodiment.

FIG. 2 illustrates another method of updating a test suite according to at least one example embodiment. The method steps described with regard to FIG. 2 may be executed as software code stored in a memory (e.g., at least one memory 410 described below) associated with a system (e.g., as shown in FIG. 4) and executed by at least one processor (e.g., at least one processor 405 described below) associated with the system. However, alternative embodiments are contemplated such as a system embodied as a special purpose processor.

For example, the method steps may be performed by an application-specific integrated circuit, or ASIC. For example, the ASIC may be configured as one or more of the blocks, or elements of the blocks, (e.g., the application test module 430 described below) and/or the apparatus 400. Although the steps described below are described as being executed by a processor, the steps are not necessarily executed by a same processor. In other words, at least one processor may execute the steps described below with regard to FIG. 2.

As shown in FIG. 2, in step S205 a processor (e.g., at least one processor 405) captures an execution scenario. For example, an execution scenario may include inputs to and outputs of an application (or element of an application). An input may include user interaction (e.g., keystrokes or mouse clicks) and/or external data (e.g. files such as video files, picture files and/or data files) and/or system configuration data (e.g., the state of the cloud infrastructure). The inputs and outputs may be associated with real-time execution of the application. For example, the inputs and outputs may be associated with the initial start of the application, an intermediate step or branch of the application and/or a completion (or extended pause) of the application and/or sub-element (e.g., function or routine) of the application.

Capturing an execution scenario may include gathering the inputs and outputs without interfering in the execution of the application. Gathering the inputs and outputs may include reading (without affecting the execution of the application) the input and output data and categorizing (e.g., type of data, where the data came from and/or where the data is sent). In other words, capturing an execution scenario may include gathering real-time application execution input and output data and categorizing the data as, for example, an input keystroke, an output image display, a cloud infrastructure state change, and the like.

In step S210 the processor stores the captured execution scenario. For example, the processor may have an associated memory including, for example, a database. The processor may store the data associated with the execution scenario in the database. Alternatively, and/or in addition to, the data may be stored in a temporary memory location. For example, the data may be stored in a temporary memory location if the processor is configured to selectively store the captured execution scenario. For example, the processor may be configured to selectively store execution scenarios if the processor stores execution scenarios that are not covered by the test suite (e.g., execution scenarios not included in a test case).

In step S215 the processor determines a code template. For example, a code template may define a series of code language (e.g., JAVA, C++, Visual Basic) statements that acquire input data, input the data to the application and capture output data. For example, the code template may be associated with an execution scenario where data is input by a mouse pointer "pressing" a button on an application in order to initiate playing a movie (e.g., a streaming video movie). Additional input may include a file name and location for the movie as well as capabilities of the server (e.g., playback rate) streaming the video. The output may be displaying the video on a client computer. The output may also include quality information such as buffering and video clarity indicators.

Therefore, the code template may include code statements to simulate "pressing" the button on the application and inputting the file name and location. The code statements may also include code to select a server with the requisite capabilities and to monitor the resultant video display and quality of the display. Other code templates are within the scope of this disclosure. Some may be variants of each other. For example, the above video playback example may be modified such that instead of using the press of a "button" to initiate video playback, a keystroke (e.g., "ctrl"+"p") may initiate video playback. Other code templates are contemplated and well within the scope of this disclosure.

In step S220 the processor determines execution scenario variables. For example, the processor may evaluate the code template and the input/output data. From this evaluation, the processor may determine the code template includes a definition including required and/or optional inputs. From the input/output data, the processor may ascertain information that may be mapped to the required and/or optional inputs as input execution scenario variables. Continuing the video playback example above, the processor may determine that for the "button" press code template a file name, a file type and a file location are required. The processor may determine execution scenario variables to be the file name and file location (as captured above) and evaluate the file name (or determine from a previous categorization) to determine the file type.

In step S225 the processor defines execution code scenario results. The execution code scenario results may be predetermined (e.g., by a code designer or a service level agreement (SLA). For example, the test suite (and/or application) may include one or more "oracles". The oracles may define minimum (or maximum) specifications (including variables) indicating the application has performed as expected and/or designed. For example, continuing the video playback example above, one of the oracles may include one or more variables defining video playback quality on a client computer. Therefore, defining execution code scenario results may include selecting an oracle and reading the specifications for the code template.

Further, the execution code scenario results may be used to generate new oracles as, estimated oracles. An estimated oracle may be based on detected results and/or a modified oracle previously existing in the test suite. An oracle can be, for example, an existing reference or alternative implementation of the application under test. The reference implementation is then treated as the standard against which the behavior of the application under test is evaluated. Alternatively, if no such reference implementation exists, a model of the theoretically correct behavior may be used. For example, the model may be a state model, indicating, for example, what page a web application should display in reaction to a particular user input, for example, a mouse click on a particular page element. Alternatively, if a reference implementation and/or a model is not available, determining execution code scenario results may include determining "nominal" ranges of values that each internal variable may assume by observing repeated executions (assumed correct) and by recording an internal state (e.g., function flow or order, sub-routine flow or order, code (e.g., if-then-else, case statements, and the like) flow or order, and the like) including, for example, internal variables (e.g., function input/output, communication variables, display information and the like) of the application during those executions. This information, which can be improved with more observations, can be used to construct an (approximated) oracle. If the value of an internal variable falls outside the "nominal" range, a wrong behavior has likely occurred. The accuracy of the oracle increases as more observations are collected to build the oracle.

The test case may also test internal execution of the application. For example, the test case may test code loops (e.g., do-while), code conditionals (e.g., if-then and case statements), and subroutines. Therefore, determining execution scenario variables and defining execution code scenario results may also include determining respective variables for testing and evaluating internal execution of the application. For example, continuing the video playback example above, the code template may include a test to determine if the application properly handles a video buffer overflow. The application may include a subroutine for trapping video buffer overflows. Determining execution scenario variables and defining execution code scenario results may also include variables for evaluating the performance of the video buffer overflow subroutine (e.g., a maximum amount of time the server should discontinue streaming the video).

In step S230 the processor generates a test case. For example, the processor may combine the code template, the execution scenario variables and the execution code scenario results for the application and/or the internal execution of the application the together as a test case.

In step S235 the processor updates the test suite. A test suite may be, for example, a grouping of test cases utilized to test the quality of an application. The test suite may define what test cases are run on a given application. The test suite may contain detailed instructions and/or goals for each collection of test cases and information on the system configuration to be used during testing. The test suite may also include reporting mechanisms that may report quality test coverage status, quality test completion, quality issues, test failures, and the like. The processor may update the test suite by, for example, adding a test case (including data associated with the captured scenario and expected output), executing a test of the application based on the test case and/or updating quality information about the application (e.g., test coverage status). For example, processor may add the video playback test case, execute the video playback test case and update test coverage statistics based on the results of the execution.

Although the method of FIG. 2 was described using a video playback application as an example, example embodiments are not limited thereto. For example any application that may be developed, tested and distributed as described herein are within the scope of this disclosure. For example, a game application(s), an office productivity application(s), a business productivity application, and the like all may fall in the scope of this disclosure.

Figure 3:
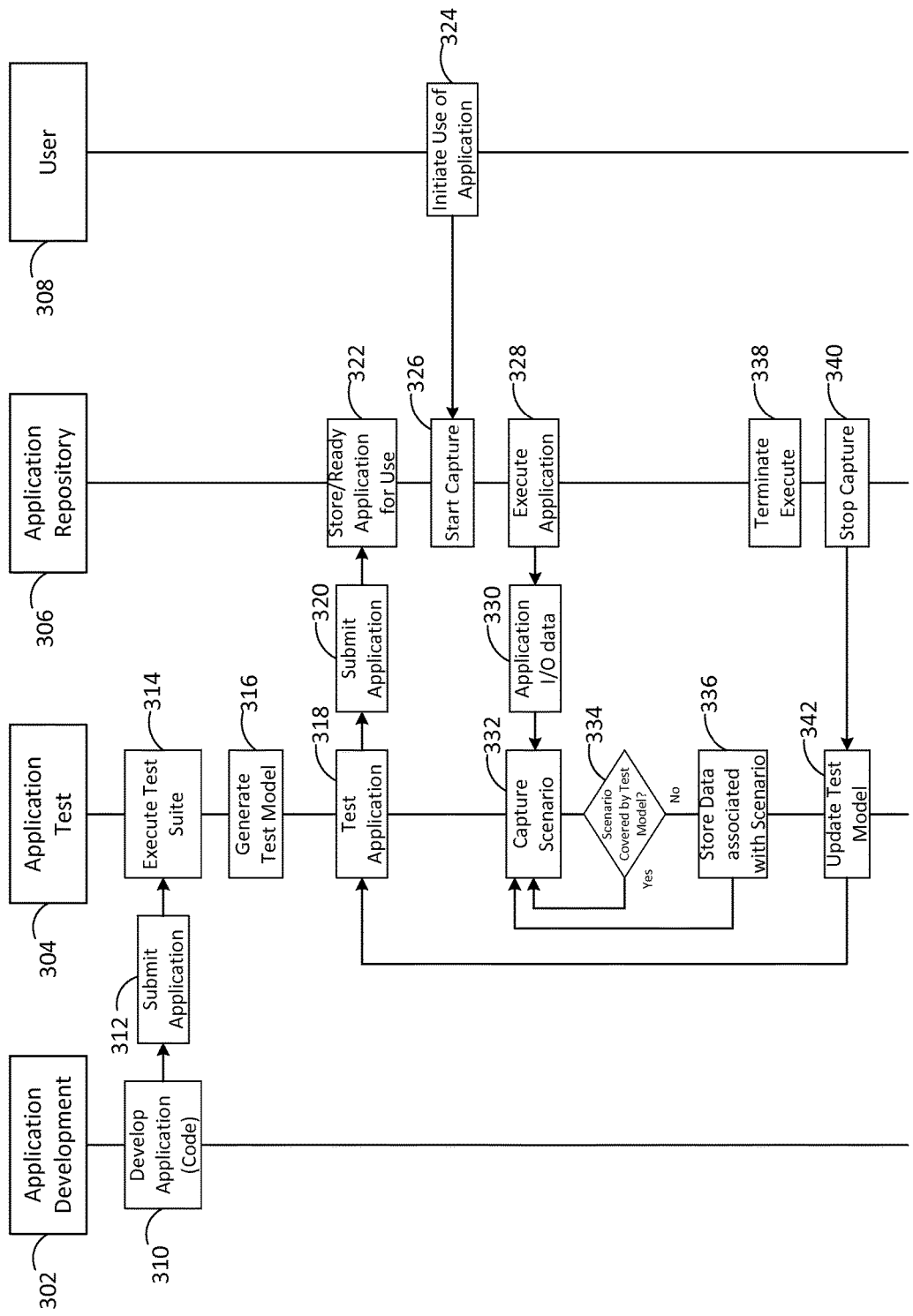
FIG. 3 illustrates a flow diagram according to at least one example embodiment.

FIG. 3 illustrates a flow diagram according to at least one example embodiment. The blocks described with regard to FIG. 3 may be executed as software code stored in a memory (e.g., at least one memory 410) associated with a system (e.g., as shown in FIG. 4) and executed by at least one processor (e.g., at least one processor 405) associated with the system/apparatus. For example, the processor may be associated with one or more of the blocks (e.g., blocks 420, 425, 440, and the like) or the apparatus 400. However, alternative embodiments are contemplated such as a system embodied as a special purpose processor.

For example, the blocks may be performed by an application-specific integrated circuit, or ASIC. For example, the ASIC may be configured as one or more of the blocks (e.g., blocks 420, 425, 440, and the like) and/or the apparatus 400. Although the blocks described below are described as being executed by a processor, the blocks are not necessarily executed by a same processor. In other words, at least one processor may execute the blocks described below with regard to FIG. 3.

As shown in FIG. 3, processing flow is passed between application development 302, application test 304, an application repository 306 and a user 308. Each of the blocks may be executed on a same apparatus/system (e.g., cloud computing infrastructure) and/or on separate systems (e.g., application development can be performed on a developer computer, application test 304 and application repository 306 on a cloud server, and user 308 on a client computer).

Initially an application is developed (e.g., code is generated) and made ready for distribution (block 310). The application is submitted (block 312) by the application development 302 to the application test 304. A test suite is selected (block 314) and a test model is generated (block 316). For example, the test suite may be developed by the by the developer in conjunction with the application. However, the initial test suite may not yield a 100% coverage test model (e.g., test all possible inputs, outputs and execution paths) of the application. For example, there may be some program execution paths that are not covered by any test in the test model. The application is tested (block 318) (e.g., based on scenarios defined in the initial test model) and submitted (block 320) (assuming the test results are acceptable) to the application repository 306 where the application is stored and readied for use (block 322).

The application may be dormant in the application repository 306 until a user 308 initiates use of the application (block 326). Execution scenario capture is started (block 326) and the application begins execution (block 328). For example, after publication (e.g., in an application store), the application can be executed by the user. As soon as the application is started, the input data sent to the application (and the data exchanged with systems that are external to the application) are captured in, for example, a volatile buffer. As the application is executing, input/output data is communicated (block 330) to application test 304 and the I/O data is captured as an execution scenario is generated (block 332). If the execution scenario is not covered by the test module (block 334) the I/O data is stored in association with the execution scenario (block 336) and control returns to block 332 in order to capture the next execution scenario. Otherwise, control returns to block 332 in order to capture the next execution scenario. For example, as the execution reaches an execution point that was previously not covered by the test suite (e.g., the test model), a signal may be triggered resulting in the data stored in the volatile buffer (e.g., temporarily stored data) being flagged for permanent storage (e.g., as data not associated with a preexisting execution scenario).

For example, the processor may temporarily store application input(s) and output(s) in the volatile buffer. Then determine if a preexisting execution scenario includes the input(s) and output(s). Permanently store the input(s) and the output(s) in a non-volatile memory (e.g., at least one memory 410) if the preexisting execution scenario does not include the input(s) and the output(s). Then delete the temporarily stored input(s) and output(s) if the preexisting execution scenario includes the input(s) and the output(s). Further, generating a test case may include generating the test case based on the permanently stored input(s) and output(s).

The application continues indefinitely until execution is terminated (block 338). For example, the application may complete the task or function the application was designed to perform and/or the user terminates the application. For example, when the execution terminates, the buffer is persisted. If the execution terminates but no uncovered program points are ever reached, the buffer is simply discarded. The execution scenario capture is stopped (block 338) and the test model is updated (block 342). Control returns to block 318 where the application is tested with the updated test model. For example, the data may be persisted in, for example, a non-volatile memory, and may be used to generate a new test case instantiating a template from a library of code templates. An approximated oracle may also be constructed from the variables captured during the executions. The updated test model is used to test the application.

The results of the additional tests and the knowledge that the test coverage has possibly increased may be presented to a potential customer for the application in, for example, the application store. Displaying increased testing may infer a higher quality application resulting in an increase (or perceived increase) in trustworthiness of the application.

FIG. 4 illustrates a block diagram of an apparatus according to at least one example embodiment. As shown in FIG. 4, the apparatus 400 includes at least one processor 405 and at least one memory 410. The at least one processor 405 and the at least one memory 410 are communicatively coupled via bus 415. The system 402 may be, for example, an element of a computing device (e.g., a cloud computing device, a server or a personal computer.

In the example of FIG. 4, the apparatus 400 may be at least one computing device and should be understood to represent virtually any computing device configured to perform the methods described herein. As such, the apparatus 400 may be understood to include various standard components which may be utilized to implement the techniques described herein, or different or future versions thereof. By way of example, the apparatus is illustrated as including the at least one processor 405, as well as the at least one memory 410 (e.g., a computer readable storage medium) respectively.

Thus, as may be appreciated, the at least one processor 405 may be utilized to execute instructions stored on the at least one memory 410, so as to thereby implement the various features and functions described herein, or additional or alternative features and functions. Of course, the at least one processor 405 and the at least one memory 410 may be utilized for various other purposes. In particular, it may be appreciated that the at least one memory 410 may be understood to represent an example of various types of memory and related hardware and software which might be used to implement any one of the modules described herein. Systems and/or methods described below may include data and/or storage elements. The data and/or storage elements (e.g., data base tables) may be stored in, for example, the at least one memory 410.

As shown in FIG. 4, the at least one memory 410 includes a capture module 420, an application repository 425 and an application test module 430. The application test module includes a developer dashboard user interface (UI) 435, a test coverage module 440, a test definition module 445, test data and results storage 450, a test execution module 455, a test case generation module 460, and code templates 465.

The capture module 420 may be configured to record inputs to the target application as well as data sent to and received from external systems. The operation of the capture module 420 may be driven by the coverage model, which may describe which elements of the application have already been covered by the existing test suite and, therefore, which program points and paths remain to be covered. This information determines which inputs and communication data to retain and which to discard. The capture process may take place in two phases. In a first phase, data is captured and stored in a volatile buffer as soon as the application execution reaches a point which unambiguously determines whether or not a new uncovered program point will be reached. In a second phase, the data is stored in a permanent record (and keeps being captured) or the capture is stopped for that execution (invocation) and the data already collected in the volatile buffer may be discarded as not relevant. The capture is efficient because relevant data is recorded, and the relevance is determined directly from the coverage model.

Further, the capture module 420 behavior may self-adaptive in that the capture module 420 changes as the coverage model changes (as a consequence of new test cases being added to the test suite). The capture module 420 may communicate with the developer dashboard UI 435 to allow a developer to manage captured (or the capture of execution scenarios. The capture module 420 may also communicate with the test coverage module 440 to read the coverage model. The capture module 420 may also generate execution traces and monitor applications in order to capture execution scenarios.

The application repository 425 may be configured to store the applications submitted by ISVs through the developer dashboard UI 435 and offered on the application store. In the application repository 425, each application is associated with several additional artifacts including a test suite, and a current coverage model, which is the result of the previous execution of the test suite against the application. This information is first produced by the test execution module 455 at application registration. In addition, the test execution module 455 (at application registration) may generate the coverage model. The application repository 425 may add probes into the application so that the capture module 420 may monitor the execution and be notified when relevant program locations are reached.

The developer dashboard UI 435 may be configured to allow users of the apparatus 400 (e.g., ISVs) to interact with the apparatus 400. The developer dashboard UI 435 may be configured to expose several functions. For example, the developer dashboard UI 435 may be configured as the interface through which new applications can be submitted to the application store, and through which existing applications may be managed. The developer dashboard UI 435 may be configured to allow an ISV to remove or upgrade applications, force the execution of tests, monitor the test synthesis and the update of the coverage model, and inspect the execution data record. The developer dashboard UI 435 may be configured to allow ISVs to manage the capture module 420 and revise the capture process (e.g., to exclude certain elements of the application to reduce the overhead of monitoring).

The developer dashboard UI 435 may be configured to allow ISVs to manage the test suite for a given application and to configure the code generation process and the code templates 465 the code generation process is based on. The code of new test cases may be manually inspected and revised. The developer dashboard UI 435 may be configured to enable a developer to check and refine the assertions that represent the inferred test oracle. The developer dashboard UI 435 may interface with the developer of the application to allow management of execution scenario captures, to allow management of the application repository and to allow management of the test suite. For example, the developer dashboard UI 435 may communicate with the capture module 420, the application repository, test definition module 445, and the test case generation module 460 in order to allow configuration and management of execution scenario captures, add/remove/modify applications in the application repository 425, and add/remove/modify test cases.

The test coverage module 440 is configured to generate a test coverage model which describes the elements of the application that have already been covered by the existing test suite and therefore which program points and paths remain to be covered. This information may be used to determine which inputs and communication data to retain and which to discard. Further, the test coverage module 440 may maintain statistics and quality information about the test coverage model (e.g., a percentage of coverage). The statistics and quality information about the test coverage model may be used to communicate a trustworthiness (e.g., in an application store) to a potential customer for the application.

The test definition module 445 may be configured to maintain the test suite as selected by/provided by the developer of the application. The test definition module 445 may be configured to store the test cases associated with the test model and the updated test model. The test data and results storage 450 may be configured to store (e.g., in a data base or other non-volatile memory) input data, output data and oracles as described above.

The test execution module 455 may be configured to set up the test execution environment and configured to execute the test suite. As additional test cases are added to the test suite, the test execution module 455 may be configured to execute the additional test cases and update the coverage model. The test execution module 455 may be configured to communicate with the test definition module 445 to read and execute a test case from the test suite. The test execution module 455 may be configured to communicate with the test coverage module 440 in order to update the coverage model based on a completed test. In other words, the test execution module 455 may be configured to communicate with the test coverage module 440 in order to update the information used to construct an (approximated) oracle.

The test case generation module 460 may be configured to monitor the execution data record and generate new test input data and a tentative oracle. The test case generation module 460 may be configured to convert the test input data into executable code based on a set of code templates 465. To produce an approximated oracle, the test case generation module 460 may use the invariants detected during both the real-time executions and the test suite executions and add the approximated oracle as assertions to the code of the test case. Code templates 465 may be a repository (e.g., non-volatile memory storage) of code templates for use in generating test cases as described above. The test case generation module 460 may be configured to communicate with the test data and results storage in order to (persist or) store test data and test oracles. The test case generation module 460 may be configured to communicate with the test definition module 445 in order to update the test suite for the application. The test case generation module 460 may be configured to read code templates 465 from memory in order to read code templates for test case generation.

Although the disclosure described above is with regard to cloud computing infrastructures and PaaS, example embodiments are not limited thereto. For example, the described application may be associated with an application store that distributes applications to client devices (e.g., a cellular device or cell phone). In this example, the client device may include additional features. For example, the client device may include a module configured to communicate application I/O data (as in block 330 described above to a cloud infrastructure device including apparatus 400. Further, additional features may be contemplated. For example, I/O data representing existing execution scenarios may be saved until expunged by, for example, the developer. In this way, developers may use this I/O for some other form of testing and/or to further refine existing test cases using, at least, some of the techniques described above.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium (e.g., non-transitory medium) or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method for generating a new test case used for quality testing of an application available in a digital marketplace that makes multiple applications available for a customer to make a choice between, the method comprising:

capturing an execution scenario associated with a real-time execution of the application;
   determining at least one scenario variable based on the execution scenario;
   determining whether a preexisting test case includes the execution scenario;
   upon determining a preexisting test case does not include the execution scenario:
      generating a test case based on a code template, the execution scenario and the at least one scenario variable, wherein the code template includes code statements configured to simulate the execution scenario on the application and a definition using the at least one scenario variable, and
      updating a test suite using the test case, the test suite configured to define a quality test of the application, updating the test suite including updating a quality information indicator based on the test case, the quality information indicator associated with the application and displayed in the digital marketplace so as to be visible to the customer when making the choice;
   determining observed ranges of values that one or more internal variables of the application may assume by observing repeated executions and by recording an internal state of the application during the repeated executions, wherein the one or more internal variables are determined based on the internal state of the application;
   generating an estimated oracle based on the observed ranges of values, the estimated oracle defining at least one of minimum or maximum specification of the internal variable;
   performing a test of the application based on the test case; and
   comparing a result of the test to the oracle.

2. The method of claim 1, wherein the execution scenario is based on at least one application input, the at least one application input being at least one of a user input, an input acquired by the application and information associated with an apparatus on which the application is executed.

3. The method of claim 1, wherein the execution scenario is captured without interfering in the execution of the application.

4. The method of claim 1, wherein the at least one scenario variable is a variable associated with at least one of a user input, an input acquired by the application and information associated with an apparatus on which the application is executed.

5. The method of claim 1, wherein generating the test case includes selectively generating a new test case based on existing test cases associated with the test suite.

6. The method of claim 1, further comprising:
   temporarily storing at least one application input and at least one application output;
   determining if a preexisting execution scenario includes the at least one application input and at least one application output;
   permanently storing the at least one application input and the at least one application output if the preexisting execution scenario does not include the at least one application input and the at least one application output; and
   deleting the temporarily stored at least one application input and at least one application output if the preexisting execution scenario includes the at least one application input and the at least one application output, wherein generate the test case includes generating the test case based on the permanently stored at least one application input and at least one application output.

7. The method of claim 1, wherein the execution scenario is based on at least one application output, the at least one application output being a result of the application execution.

8. The method of claim 1, further comprising:
generating a test model based on the test suite and at least one preexisting test case, wherein updating the test suite includes adding the test case to the test model.

9. The method of claim 1, wherein
capturing the execution scenario associated with the real-time execution of an application includes:
recording the internal state of the application during the real-time execution, and
determining the one or more internal variables based on the internal state of the application;
generating the test case includes generating a new test case including the execution scenario based on the oracle; and
the method further comprises performing a test of the application based on the new test case.

10. The method of claim 1, further comprising:
generating a test coverage model which describes elements of the application that are covered by the existing test suite; and
displaying, on a user interface, information related to the test coverage model.

11. The method of claim 10, wherein the coverage model changes as a consequence of the test suite being updated using the test case, the method further comprising adapting the capturing of the execution scenario based on the change in the coverage model.

12. A system for generating a new test case used for quality testing of an application available in a digital marketplace that makes multiple applications available for a customer to make a choice between, the system including a non-transitory computer readable medium including code segments that when executed by a processor cause the processor to:
capture an execution scenario associated with a real-time execution of an application;
determine at least one scenario variable based on the execution scenario;
determine whether a preexisting test case includes the execution scenario;
upon determining a preexisting test case does not include the execution scenario:
generate a test case based on a code template, the execution scenario and the at least one scenario variable, wherein the code template includes code statements configured to simulate the execution scenario on the application and a definition using the at least one scenario variable, and
update a test suite using the test case, the test suite configured to define a quality test of the application, updating the test suite including updating a quality information indicator based on the test case, the quality information indicator associated with the application in the digital marketplace so as to be visible to the customer when making the choice;
determine observed ranges of values that one or more internal variables of the application may assume by observing repeated executions and by recording an internal state of the application during the repeated executions, wherein the one or more internal variables are determined based on the internal state of the application;
generate an estimated oracle based on the observed ranges of values, the estimated oracle defining at least one of minimum or maximum specification of the internal variable;
perform a test of the application based on the test case; and
compare a result of the test to the oracle.

13. The system of claim 12, wherein the execution scenario is based on at least one application input, the at least one application input being at least one of a user input, an input acquired by the application and information associated with an apparatus on which the application is executed.

14. The system of claim 12, wherein the at least one scenario variable is a variable associated with at least one of a user input, an input acquired by the application and information associated with an apparatus on which the application is executed.

15. The system of claim 12, wherein generating the test case includes selectively generating a new test case based on existing test cases associated with the test suite.

16. The system of claim 12, wherein the code segments, when executed by the processor, further cause the processor to:
temporarily store at least one application input and at least one application output;
determine if a preexisting execution scenario includes the at least one application input and at least one application output;
permanently store the at least one application input and the at least one application output if the preexisting execution scenario does not include the at least one application input and the at least one application output; and
delete the temporarily stored at least one application input and at least one application output if the preexisting execution scenario includes the at least one application input and the at least one application output, wherein generate the test case includes generating the test case based on the permanently stored at least one application input and at least one application output.

17. The system of claim 12, wherein the execution scenario is based on at least one application output, the at least one application output being a result of the application execution.

18. The system of claim 12, wherein the code segments, when executed by the processor, further cause the processor to:
generate a test model based on the test suite and at least one preexisting test case, wherein updating the test suite includes adding the test case to the test model.

19. The system of claim 12, wherein
capturing the execution scenario associated with the real-time execution of an application includes:
recording the internal state of the application during the real-time execution,
determining the one or more internal variables based on the internal state of the application;
generating the test case includes generating a new test case including an execution scenario based on the oracle; and
the code segments, when executed by the processor, further cause the processor to perform a test of the application based on the new test case.

20. The system of claim 12, wherein the code segments, when executed by the processor, further cause the processor to: generate a test coverage model which describes elements of the application that are covered by the existing test suite, wherein the coverage model changes as a consequence of the test suite being updated using the test case, and adapt the capturing of the execution scenario based on the change in the coverage model.

\* \* \* \* \*